United States Patent [19]

Matz

[11] Patent Number: 5,178,713

[45] Date of Patent: Jan. 12, 1993

[54] METHOD FOR THE PREPARATION OF WORKPIECES OF COMPOSITE FIBER MATERIALS

[75] Inventor: Christoph Matz, Oldenburg, Fed. Rep. of Germany

[73] Assignee: Messerschmitt-Bolkow-Blohm GmbH, Ottobrunn, Fed. Rep. of Germany

[21] Appl. No.: 758,235

[22] Filed: Sep. 9, 1991

Related U.S. Application Data

[63] Continuation-in-part of Ser. No. 475,337, Feb. 5, 1990, abandoned.

[30] Foreign Application Priority Data

Feb. 8, 1989 [DE] Fed. Rep. of Germany ....... 3903601

[51] Int. Cl.$^5$ ................................................. C09J 5/04
[52] U.S. Cl. .................................. 156/319; 106/286.8; 106/287.32; 156/281; 156/308.6; 156/330; 427/322
[58] Field of Search ..................... 156/319, 281, 308.6, 156/330; 427/322; 106/286.8, 287.32

*Primary Examiner*—John J. Gallagher
*Attorney, Agent, or Firm*—Anderson, Kill, Olick & Oshinsky

[57] ABSTRACT

In a method for the preparation of surfaces of workpieces of composite fiber materials, which are to be subjected to a subsequent gluing or coating process, a wet chemical pretreatment of the surface in question is carried out with a solution, which contains a proportion of peroxodisulfate ions.

3 Claims, No Drawings

METHOD FOR THE PREPARATION OF WORKPIECES OF COMPOSITE FIBER MATERIALS

This is a continuation-in-part of application Ser. No. 07/475,337 filed Feb. 5, 1990, now abandoned.

FIELD OF INVENTION

The present invention relates to a method for the preparation of workpieces of composite fiber materials in which the surface areas to be adhesively joined are subjected to a wet chemical treatment. The inventive method is carried out prior to the adhesive joining or gluing.

The term "composite fiber materials" for the purposes of this application is deemed to refer to materials which comprise reinforcing fibers, such as, for example, glass fibers, aramide fibers and carbon fibers, and an organic polymeric embedding mass, for example, epoxy resin, polyester resin, thermoplasts and the like.

BACKGROUND INFORMATION AND PRIOR ART

Mechanical, abrasive processing methods are used predominantly at the present time for the pretreatment of workpieces of composite fiber materials, which are to be joined together by gluing. However, such mechanical methods require a relatively high degree of control, in order to ensure the required reproducibility of the surface quality of the workpieces to be joined. The surface quality alone guarantees the optimum adhesion of the gluing. On the other hand, it cannot be reasonably assumed with such a mechanical pretreatment that the strength properties of the work pieces, so pretreated, will remain unaffected.

Another possibility for achieving the residue-free, reproducible surface required for gluing may under some circumstances be provided by the removal, immediately before the gluing step, of the fragmented tissue that is still present. This method, however, is not universally usable and its reliability must therefore be demonstrated anew for each combination of composite fiber material and adhesive. Particularly in the case of composite fiber material with improved strength properties, this method frequently, moreover leads to unsatisfactory results.

Finally, attempts have been made to employ wet chemistry pretreatment methods of the type mentioned at the beginning. Up until now, these methods have been either comparatively unsuccessful or their introduction into the production process has been opposed, as in the case of a use of chromic acid, by industrial hygiene and environmental points of view.

OBJECT OF THE INVENTION

It is therefore the object of the present invention to provide a method of the type above mentioned wherein, in a superior and simple manner, a reproducible pretreatment of workpiece surfaces of composite fiber materials by chemical means, without requiring the use of substances which, even if employed on a large scale, are questionable from any industrial hygiene or environmental point of view.

SUMMARY OF THE INVENTION

Pursuant to the inventive method, the wet chemical pretreatment is carried out with an aqueous solution, which contains a proportion of peroxodisulfate ($S_2O_8^{--}$) ions. Preferably, an aqueous ammonium peroxodisulfate [$(NH_4)_2S_2O_8$] is used, the concentration of which, in a preferred embodiment of the inventive method, is about 75 g/L.

The pretreatment causes a reactive modification of the workpiece surfaces to be joined. The components, produced by means of gluing of the pretreated workpieces, achieve excellent strength properties. At the same time, the glued joints are extremely resistant to climatic effects, especially to warm, humid conditions.

This is also shown by the mechanical testing of laboratory samples of simply overlapped tensile shear samples of components reinforced with carbon fibers. Before they were glued together with a conventional, commercial adhesive (Hysol EA 9321), the surfaces of these samples were pretreated mechanically or by wet chemistry. The indicated HYSOL EA 9321 is a commercially available two-component, room temperature curing epoxy adhesive manufactured by the Derter Corporation, Hysol Division, Pittsburg, Calif. However, other epoxy adhesives may successfully be applied, such as HYSOL EA 9394, which is also a two-component, room temperature curing epoxy adhesive. Other adhesives which have been successfully tried are AF 191, manufactured by 3M which is a one-component epoxy adhesive curing at 350° F., and BSL 322, manufactured by Ciba-Geigy, also a one-component epoxy adhesive curing at 350° F. The glued test samples were then exposed to moist, humid conditions (water at 70° C.) until they were saturated. Those test samples, which had been oxidatively pretreated with a 7.5% aqueous solution of ammonium peroxodisulfate, not only showed the highest strength values of all the test samples examined in tensile tests, but also demonstrated, by means of the morphology of the fracture surface, that the greatest proportion of cohesive fracture (rather than adhesive failure) occurred with these samples. These results hold good for the samples, which had not been previously stored as well as for the samples which had been stored under moist, warm conditions. The high proportion of cohesive fracture, especially under these conditions, makes it clear that the wet chemical treatment according to the inventive method accomplishes that the joint surfaces are largely insensitive to climatic stresses.

The pretreatment of the joint surfaces can be achieved either by immersing the workpieces in the solution or by spraying the workpieces with the solution or by coating the workpiece with a thixotropic paste, which contains the peroxodisulfate ions. Subsequently, the workpiece should be rinsed thoroughly and dried.

The method disclosed is also suitable as a pretreatment of those workpieces, which are subsequently to be provided with a coating, for example, as a surface protection.

The invention will now be described by an Example, it being understood that this Example is given by way of illustration and not by way of limitation.

EXAMPLE

Plates of 1 mm thickness and comprising 8 layers were used as substrate material. The plates were reinforced with unidirectional tape of an epoxy resin mass which was modified with thermoplastic components and was reinforced with carbon fibers. The plates were cured at 175° C. with all the layers in 0° direction. The plates thus obtained were cleaned by wiping them with ethylmethyl ketone. They were subsequently pretreated by dipping them for 30 mins. in an aqueous ammonium-peroxodisulfate solution of 7.5% concentration. The pretreatment was effected at room temperature. After rinsing with demineralized water and drying in an air drying furnace with circulating air at 40° C., the plates were glued with a 2-component epoxy adhesive, such as Hysol EA 9321, which cures at room temperature. Tensile shear samples with simple overlap were produced in accordance with DIN 53 283.

The following strength properties were obtained:

| STORAGE | TEST TEMPERATURE [°] | STRENGTH [N/mm$^2$] | FRACTURES [% COHESIVE FRACTURES] |
| --- | --- | --- | --- |
| None | room temperature | 28.0 | 70 |
| none | 70 | 26.1 | 80 |
| 1000 hours in H$_2$O at 70° C. | 70 | 19.6 | 70 |

I claim:

1. In a method for the pretreatment of workpieces of composite fiber materials, in which surface areas of the workpieces are to be adhesively joined utilizing an epoxy resin adhesive and, prior to said joining, said surface areas are subjected to a wet chemical treatment, the improvement which comprises that said treatment is carried out with an aqueous solution which contains a proportion of peroxodisulfate (S$_2$O$_8$—) ions.

2. The improvement of claim 1, wherein the solution contains ammonium peroxodisulfate ((NH$_4$)$_2$S$_2$O$_8$).

3. The improvement of claim 2, wherein the solution comprises between about 75 g/L ammonium peroxodisulfate.

* * * * *